United States Patent Office 3,095,119
Patented June 25, 1963

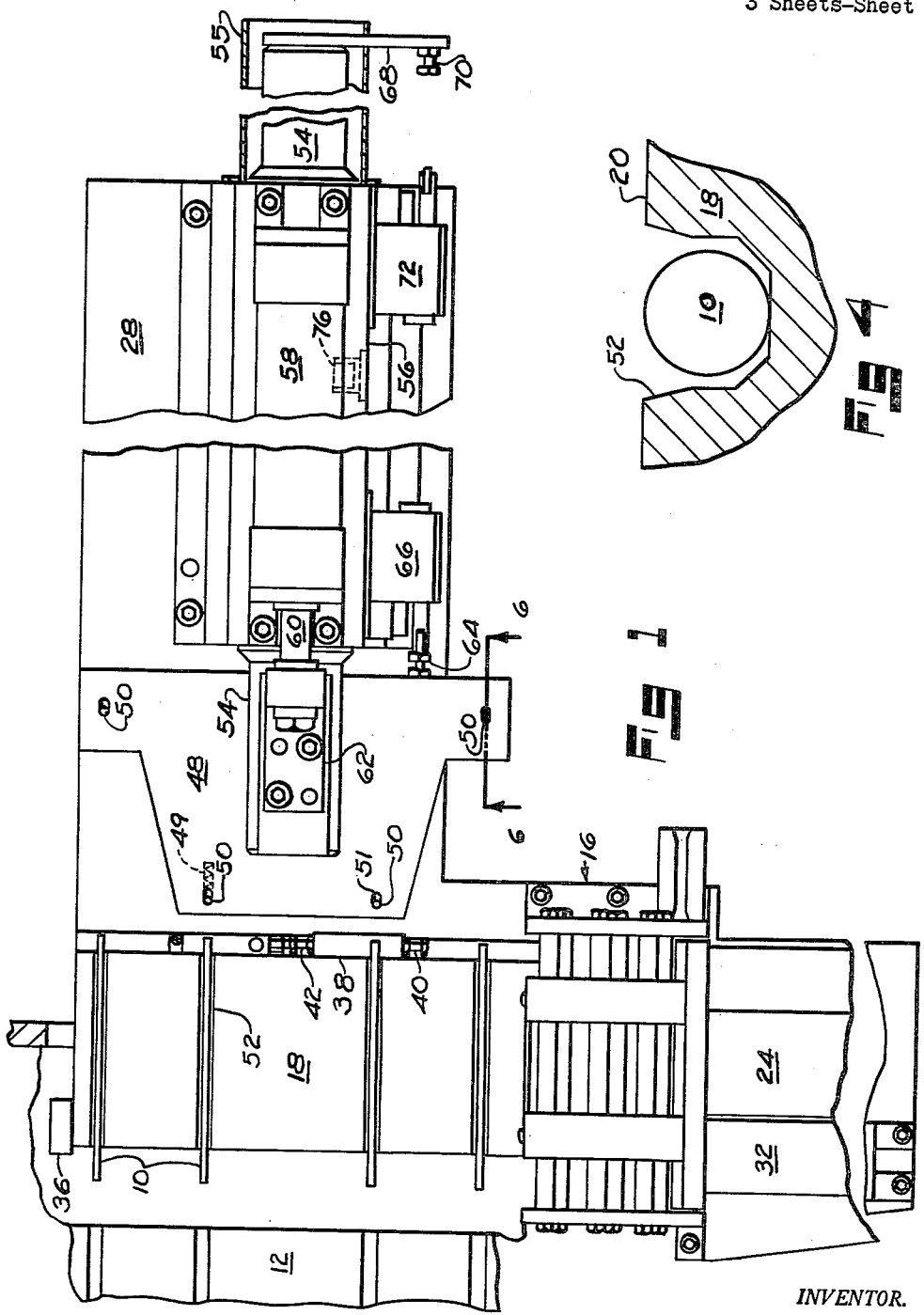

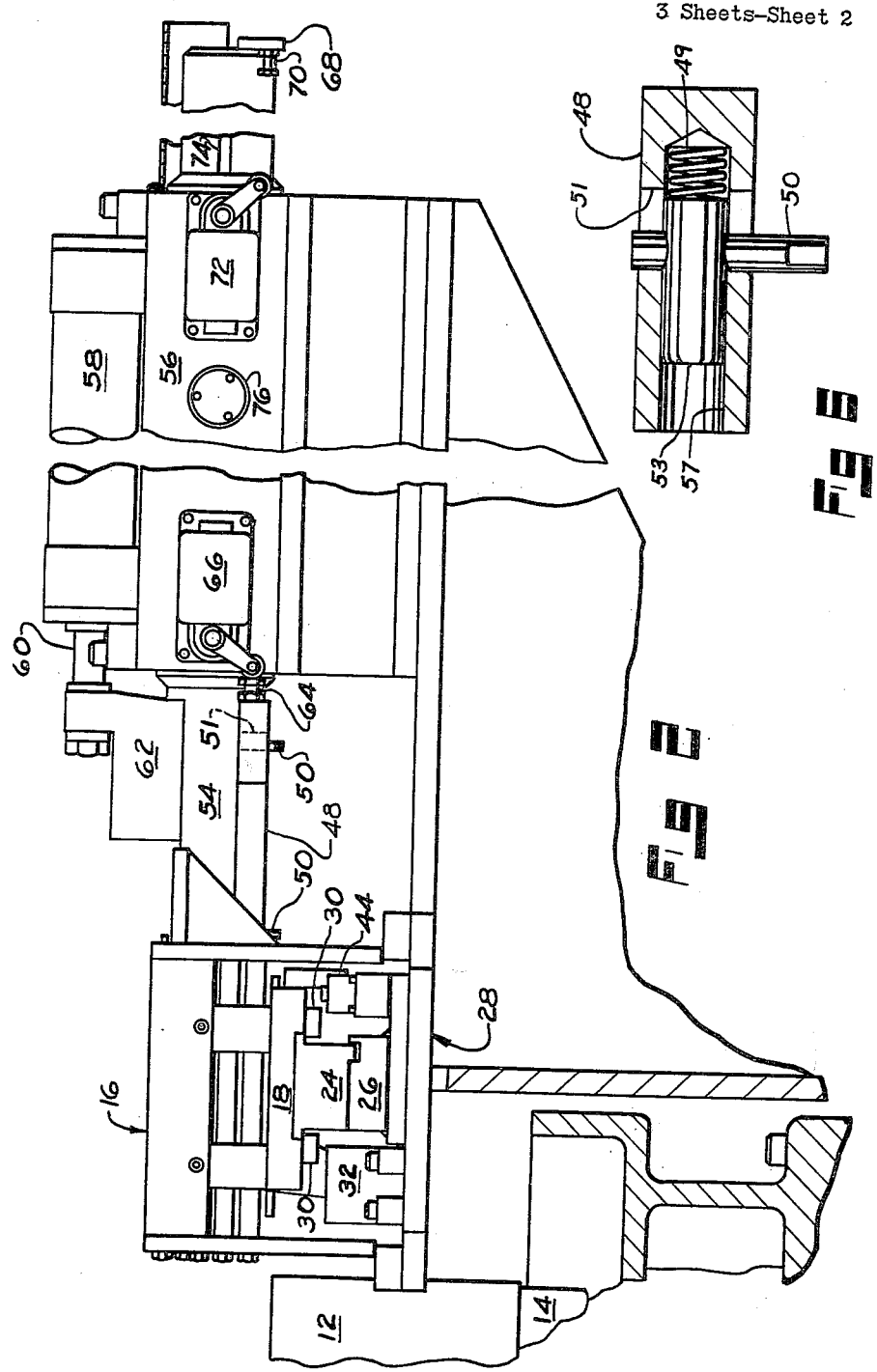

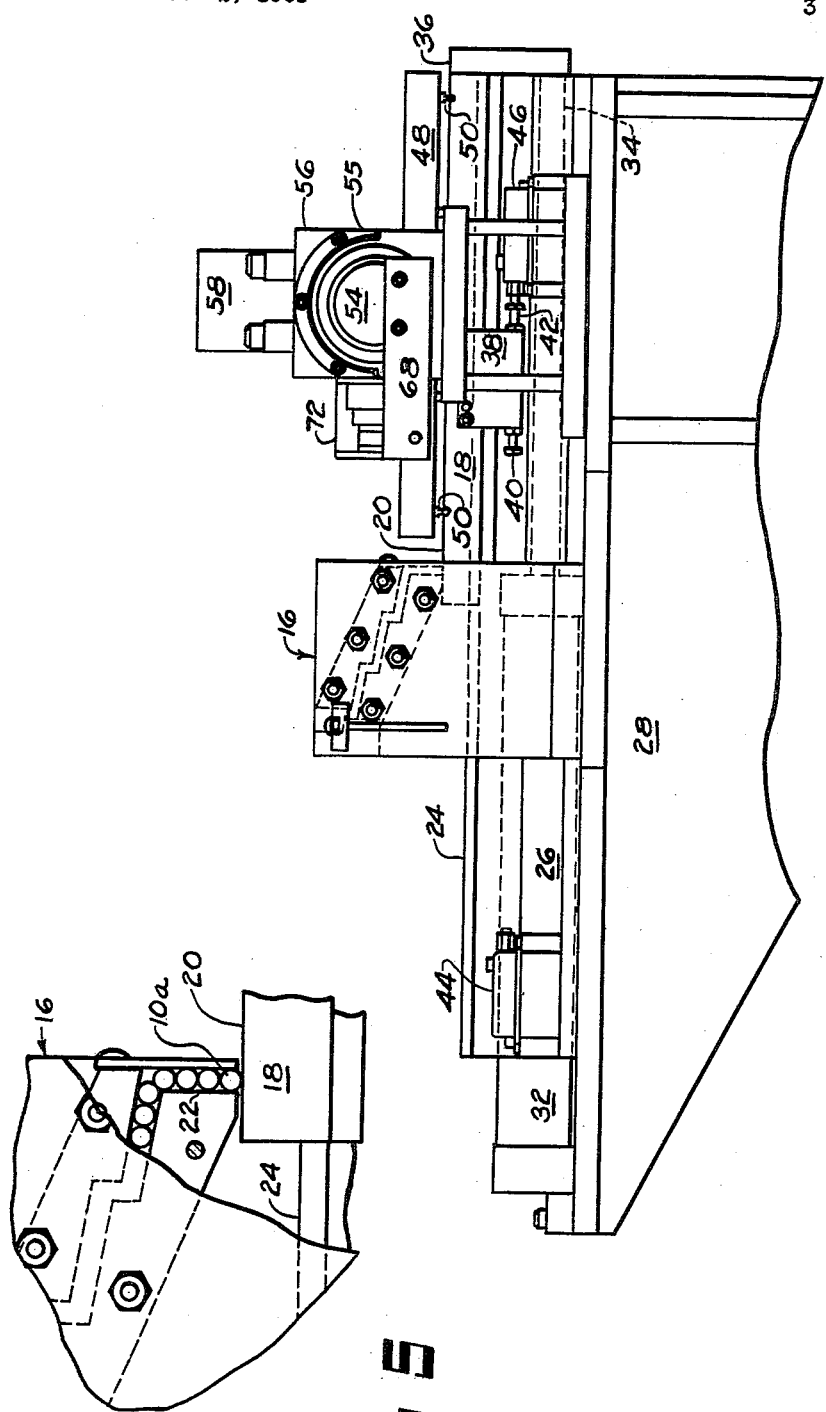

3,095,119
CONVEYOR MECHANISM
Henry Gill, Cincinnati, Ohio, assignor to The Cincinnati Milling Machine Co., Cincinnati, Ohio, a corporation of Ohio
Filed Oct. 2, 1961, Ser. No. 142,317
1 Claim. (Cl. 221—234)

This invention relates to an automatic conveyor mechanism and is particularly adapted for transferring workpieces to a machine tool fixture.

An object of this invention is to provide an automatic conveyor which can simultaneously move a multiplicity of workpieces into a holding fixture.

Another object is to provide a conveyor which will automatically create a predetermined spaced relationship between a plurality of workpieces prior to simultaneous movement of the workpieces into a receiving mechanism.

Another object is to provide a conveyor which will transport workpieces from a common point to a plurality of spaced locations automatically.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form of this invention, a supply of workpieces is furnished for transfer by the conveyor mechanism from a magazine in which the workpieces are in a stacked column at the magazine exit and discharged therefrom one at a time. The stacked column is supported by a carriage which has a plane upper surface across which a series of spaced slots are formed. Each of these slots is adapted to receive one workpiece as the carriage is moved transversely below the magazine. A fluid motor is connected to the carriage to move it relative to the magazine and as each slot is passed beneath the stack of workpieces, the lowermost workpiece is allowed to drop into the slot and is then transported away by the carriage. The balance of the stack is supported by the upper surface of the carriage as the carriage is shifted. Thus, as each slot passes beneath the stack of workpieces, one workpiece is picked off from the stack. The carriage is then moved to a loading position with a plurality of workpieces spaced therein in accordance with the spacing of the slots.

A fluid motor power ram is positioned adjacent the carriage in its loading position. The ram has a plurality of members, each of which is in alignment with one of the slots and is adapted to engage and push a workpiece therefrom when the ram is advanced in a stroke parallel to the slots. Thus, by operation of the ram motor after the carriage has been returned to its loading position, the workpieces which have been removed from the magazine and spaced apart by operation of the carriage are pushed by the ram into a mechanism such as a fixture or a milling machine which is adapted to receive the workpieces and to hold them firmly during a cutting operation. After its advance stroke toward the receiving fixture, the ram is retracted and the carriage is again ready for movement to pick off the next set of workpieces from the magazine.

A clear understanding of the operation and construction of this invention may be obtained from the following detailed description and from the attached drawings in which:

FIG. 1 is a plan view of a loading mechanism.
FIG. 2 is a side elevation of the loading mechanism.
FIG. 3 is a rear elevation of the loading mechanism.
FIG. 4 is a detailed section of a slot in the loading mechanism.
FIG. 5 is an enlarged view of a portion of the mechanism as shown in FIG. 3.
FIG. 6 is a partial section of a portion at a part of the mechanism on line 6—6 of FIG. 1.

The specific mechanism as shown in the attached drawings and to be described herein is adapted to load parts 10 (FIG. 1) having an elongated cylindrical shape into a holding fixture 12 (indicated only generally in FIG. 2) which is attached to the upper surface of a milling machine rotary index table 14. The workpieces are supplied through gravity feed from a magazine mechanism 16 which is adapted to hold a number of the workpieces in parallel and contiguous relationship. The workpieces which are immediately ready for discharge from the magazine 16 are in a stack comprised of a single file column of workpieces one on the other. In FIG. 5 a corner of the magazine is shown with the workpieces in the discharge position shown exposed. The workpieces will be discharged from the chute 22 one at a time. The stack is supported in the magazine 16 by the carriage 18 whose upper plane surface 20 is in contact with the lowermost workpiece 10a in the stack of workpieces in the discharge chute 22 of the magazine 16 to prevent the workpieces from spilling out.

As shown in FIG. 2, the carriage 18 is supported for movement on a way 24 which is fixed to a support member 26 that is, in turn, fixed to the loader mounting bracket 28. The carriage 18 is held on the way 24 by a pair of strips 30 which are fixed to the lower side of the carriage 18. The carriage 18 is movable on the way 24 by selected operation of a piston and cylinder fluid motor 32 of the hydraulic type. The motor 32 is fixed on top of the mounting bracket 28 parallel to and beside the way 24. The piston rod 34 (FIG. 3) of the motor 32 is connected to a bracket 36 which is fastened to one end of the carriage 18 to transmit motion of the piston rod 34 to the carriage 18. A bracket 38 is fastened to the carriage 18 and a pair of adjustable trip screws 40, 42 extend from the sides of the bracket 38 in opposite directions. The trip screws 40, 42 are adapted to operate limit switches 44, 46, respectively, at each end of the stroke of movement of the carriage 18. As shown, the carriage 18 is in its loading position whereby it is at its extreme rightward position as viewed in FIG. 3, and the screw 42 operates the limit switch 46.

With the carriage 18 in its loading position, a ram head 48 (FIGS. 3 and 1) is positioned slightly above and adjacent to the carriage 18. The ram head 48 is fastened to one end of a ram 54 (FIG. 1) which is supported in a casing 56 fixed to the mounting bracket 28 and which is received in the casing 56 for longitudinal motion therethrough. A piston and cylinder fluid motor 58, also of the hydraulic type, is fixed on top of the casing 56, and the piston rod 60 thereof is connected to the ram 54 by a bracket 62 to transmit motion of the piston rod 60 to the ram 54. As shown in FIG. 1, a trip screw 64 extends from the ram head 48 to operate a limit switch 66 fixed on the side of the casing 56 when the ram 54 is in the retracted position shown. In the retracted position, the ram 54 extends rearwardly under the guard 55. A bracket 68 is fixed to the rear of the ram 54, and a trip screw 70 extends therefrom to operate a limit switch 72, also attached to the side of the casing 56, when the ram 54 has completed its advance stroke, that is, movement of the ram 54 to the left as viewed in FIG. 1. A slot 74 extends longitudinally along the side of the ram 54 and is engaged by a tongue member 76 fixed to and extending inside the casing 56 to prevent the ram 54 from rotating therein as it is moved by the motor 58.

A set of pins 50 (FIG. 3) is received through slots 51 in the ram head 48, and the pins extend downwardly therefrom. As shown in FIG. 6, the pins 50 are fixed in a member 53 which is slidably received in a bore 57 in the ram head 48. A spring 49 is received behind the member 53 to create a force that normally biases the member 53 to move it to the left, as viewed in FIG. 6, until the pin 50 engages the left end of the slot 51. This is the end of the slot 51 that is toward the carriage 18 (FIG. 3). The pins 50 are all similarly received in the ram head 48, there being one for each slot 52 in the carriage 18. The pins 30 are spaced such that the lower end of each one is in alignment with one of the slots 52. The slots 52 extend across the upper plane surface 20 of the carriage 18. The slots 52, as shown in FIG. 4, are each designed to hold one workpiece 10. The upper surface of a workpiece 10 in a slot 52 extends to a point approximately in line with the upper surface 20.

In operation, the carriage 18 of the mechanism is moved to the left (as viewed in FIG. 3) from the loading position shown. As it moves to the left, the first of the slots 52 to pass beneath the single file stack of workpieces in the discharge chute 22 allows the lowermost workpiece therein to drop into the slot. The entire stack moves downward a distance equal to the diameter of one workpiece and then stops since there is just depth enough in the slot 52 for one workpiece as is shown in FIG. 4. The carriage 18 continues to move to the left, and each of the slots 52 operates to pick off the next lowermost workpiece 10 in the stack when passed beneath the magazine 16. Upon completion of the stroke away from the loading position, the limit switch 44 is operated by engagement with the screw 40, and the operation of the motor 32 thereby is reversed to cause the carriage 18 to return to its initial starting point at its loading position. Now as the slots 52 move back beneath the magazine 16, since the slots are occupied, no more of the workpieces 10 are picked off from the stack. The stack of workpieces is supported alternately by the plane surface 20 and those workpieces 10 which occupy the slots 52 as the slide 18 returns. When the carriage returns to its loading position, the limit switch 46 is operated by the screw 42, and the motor 32 is stopped with the carriage 18 in its loading position as shown.

The operation of limit switch 46 also produces a signal to initiate the operation of the motor 58 to produce an advance stroke of the ram 54 toward the receiving mechanism 12. The pins 50 move into and along the slots 52 to move the workpieces 10 therein into the receiving mechanism 12. The pins 50 are resiliently mounted in the ram head 48 as described. When the workpieces 10 are moved from the slots 52 and into their proper positions in the receiving mechanism, the bias force on each of the pins 50 yields. Thus, all of the workpieces 10 are accurately advanced into position despite any slightly variations in length. At the end of the advance stroke of the ram 54, the limit switch 72 is operated by the trip screw 70 to signal the motor 58 to reverse. The ram 54 is retracted back to its starting position where the limit switch 66 is tripped by screw 64 to stop operation of the motor 58.

The carriage 18 is now ready to return to the magazine 16 for another set of workpieces. The index table 14 is rotated to move the loaded fixture or receiving mechanism 12 away from the position adjacent the loading mechanism and to present another fixture to the same location. The movement of the index table 12 may be used to produce a signal to initiate the next loading cycle which will begin with movement of the carriage 18 through its stroke beneath the magazine 16.

What is claimed is:

An automatic conveyor mechanism adapted to move workpieces into a receiving mechanism comprising, a magazine having a discharge chute in which a single file stack of elongated workpieces can be maintained for gravity discharge therefrom one at a time, a carriage below said magazine having a plane upper surface closely spaced from said discharge chute to engage the lowermost workpiece therein and support the stack, said carriage movable between extremes defining a loading position adjacent said receiving mechanism and a retracted position, said plane upper surface having a series of spaced slots thereacross parallel to the stack of workpieces in said discharge chute, each of said slots adapted to allow the lowermost workpiece only to fall therein when moved beneath said chute, a fluid motor having a piston rod therein connected to said carriage for reciprocation of said carriage beneath said magazine between said extreme positions thereof to pass said slots beneath said chute, a ram adjacent said carriage in the loading position and opposite from said receiving mechanism, said ram having pins depending therefrom in alignment with each of said slots when said carriage is in said loading position, said pins received in said ram for limited movement parallel to said slots, yieldable bias springs to hold said pins in said ram toward said receiving mechanism, a piston and cylinder motor connected to said ram and selectively operable for reciprocation of said ram parallel to said slots between extremes defining a retracted position and an advanced position to push workpieces from said slots into the receiving mechanism, and a set of limit switches operable by movement of said carriage and ram between extremes to coordinate alternate operation of said motors.

References Cited in the file of this patent

UNITED STATES PATENTS

| | | |
|---|---|---|
| 579,357 | Brown | Mar. 23, 1897 |
| 1,834,723 | Neff | Dec. 1, 1931 |
| 2,492,250 | Wilcox | Dec. 27, 1949 |
| 2,876,325 | Baffrey | Mar. 3, 1959 |